Jan. 2, 1923.

L. M. ROWE.

AIR CIRCULATING SYSTEM FOR ORCHARDS AND THE LIKE.

FILED MAY 31, 1922.

1,440,748.

INVENTOR
L. M. Rowe
BY
ATTORNEYS

Patented Jan. 2, 1923.

1,440,748

UNITED STATES PATENT OFFICE.

LOUIS M. ROWE, OF LOS ANGELES, CALIFORNIA.

AIR-CIRCULATING SYSTEM FOR ORCHARDS AND THE LIKE.

Application filed May 31, 1922. Serial No. 564,725.

*To all whom it may concern:*

Be it known that I, LOUIS M. ROWE, a citizen of the United States, and a resident of Los Angeles, county of Los Angeles, and State of California, have invented a new and useful Air-Circulating System for Orchards and the like, of which the following is a specification.

My invention relates in general to the care of orchards and the like for preventing a drop in temperature from affecting fruits, vegetables and other plant life, and has reference more particularly to a frost preventing means which may be conveniently incorporated in an orchard or the like lay-out for producing a circulation of air in such a manner as to remove the possibility of frost, and thus save the fruit from the effects thereof.

A further object of the invention is to provide an apparatus which may be installed as a more or less permanent part of an orchard or the like lay-out and at the same time leaving the same free to be transported from one place to another without undue expense should occasion arise.

A still further object of the invention is to so construct the apparatus that it may be inexpensively manufactured and sold and operated at a reasonable expenditure, and without requiring skilled labor.

Throughout the following description I will refer to the advantages to be gained by installing the apparatus in an orchard, however, it should be clearly understood that the use of the same is in no way confined to orchards since the same valuable results may be realized with any other kind of vegetation which is affected by frost or cold temperatures.

Figure 1:
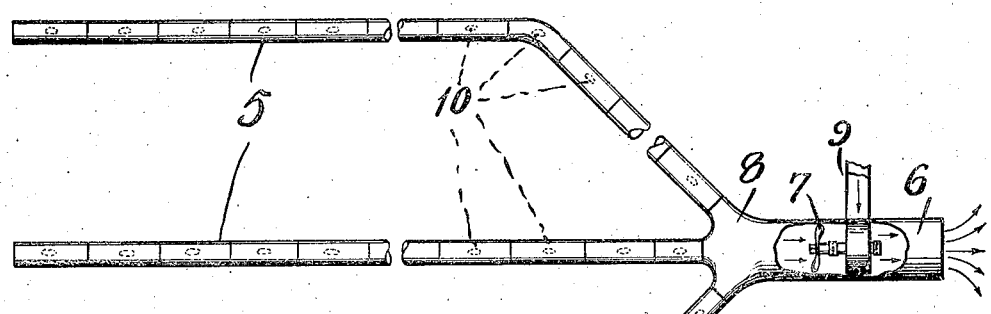
Figure 2:
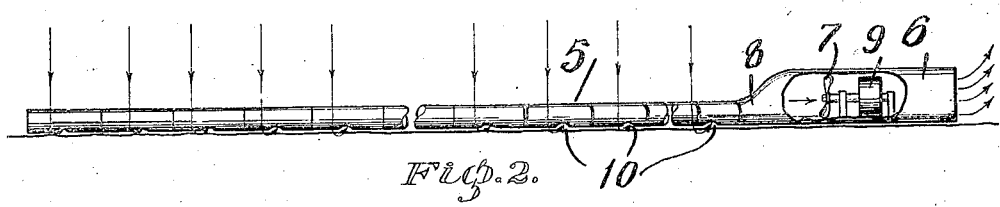

I now refer to the illustrative embodiment of the apparatus as shown in the accompanying drawing, in which Figure 1 is a plan view of the principal parts of the lay-out, and Figure 2 is a view in side elevation. Various changes in the construction of the apparatus may naturally be resorted to without departing from the spirit of the invention as defined in the sub-joined claim, consequently, the lay-out in the drawing should be considered merely for the purpose of illustrating the principle involved.

The theory on which the principle of the idea is based is confined practically to climates in which there is danger of frost occurring in certain times of the year when trees or other vegetation are bearing, and I have in mind using the apparatus to prevent frost. I cannot conceive that the plan would work with any degree of satisfaction in extreme temperatures since obviously the arrangement would prove inadequate under such conditions.

In carrying out the invention I propose to produce a downward circulation of air from over the tree tops so as to draw the warm air downwardly and circulate it back, and thus protect the trees at times when the danger of frost is apparent. The apparatus shown may be built in various ways, for instance, the preferred manner consists in providing a plurality of relatively large pipe lines (5) adapted to extend between the rows of trees or other vegetation and connected at one end with a main pipe line, such as (6), and in which a fan, such as (7), is mounted. The end of the main pipe line (6) is open and it may be turned up if desired. The pipe lines (5) all lead into the same at a branch connection, as at (8), so that by driving the fan (7) by any suitable power means from the belt (9) a suction will be created in the pipes (5) drawing the air into the main pipe line (6) and exhausting it at the open end thereof, as shown by the arrows.

Since it is desirable to take the air into the pipes (5) as close to the ground as possible, I propose to provide a multiplicity of openings in either the under sides of the pipes (5), as at (10), or the openings may be made in the upper sides of the pipes if desired. The inclination of the blades of the fans is such as to create a suction, as stated, through the pipes (5) into the main line pipe (6). The fan (7) is mounted within the main line pipe (6) in any suitable manner and is driven as stated by the belt (9), which engages a pulley on the fan shaft. This detail is immaterial, however, as any convenient driving means may be used.

The pipes may be made of any size to adequately produce the desired results, and the branch connections between the pipes (5) and the main line pipe (6) may be at any angle. Indeed the number of pipes for each main line pipe may be such as to require an entirely different structural arrangement. With the fan (7) going a suitable circulation will be set up to draw the relatively warm air down over the trees or other vegetation and remove the possibility of frost.

An important theory on which my invention is based is that the cold air which naturally settles on the ground is drawn off and further that the moisture and dew are drawn in with the flow of air and removed permitting the air in the field to warm in the morning without the cooling influence of the moisture while being evaporated.

I claim:

An apparatus of the class described comprising a plurality of pipe sections, each having openings at intervals in its length, one end of said pipes communicating with a main pipe section of relatively large diameter, a fan in said main pipe section for creating a suction in the plurality of pipe sections for sucking air through the openings therein and an exhaust opening in the main pipe section in back of the fan, substantially as and for the purpose described.

LOUIS M. ROWE.